May 2, 1933.     I. G. STOLP     1,907,372
POULTRY FEEDER
Filed April 22, 1932     3 Sheets-Sheet 3

Inventor
Ira G. Stolp
By C.A. Snow & Co.
Attorneys.

Patented May 2, 1933

1,907,372

UNITED STATES PATENT OFFICE

IRA GRANT STOLP, OF MONTEBELLO, CALIFORNIA, ASSIGNOR OF ONE-HALF TO NORMAN D. STOLP, OF MONTEBELLO, CALIFORNIA

POULTRY FEEDER

Application filed April 22, 1932. Serial No. 606,944.

The device forming the subject matter of this application is a poultry feeder. As is well known, the mortality among baby chicks and older chickens is considerable, due to the fact that they are exposed to the weather, whilst they are eating, and due to the further fact that the food becomes polluted by rain or exposure to the sun. The foregoing being true, one object of this invention is to provide a device of the class described which will adequately protect both the chickens and the food, from the weather.

Another object of the invention is to provide a device of the class described, which can be completely opened, for cleaning.

A further object of the invention is to provide a device of the class described which can be knocked down and shipped in very small compass.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

The device forming the subject matter of this application preferably is made of sheet metal, saving as otherwise specified, to promote lightness, strength, and cleanliness, and to take advantage of the other characteristics commonly attributed to sheet metal, the sheet metal preferably being galvanized, so that the structure will not rust.

Figure 2:
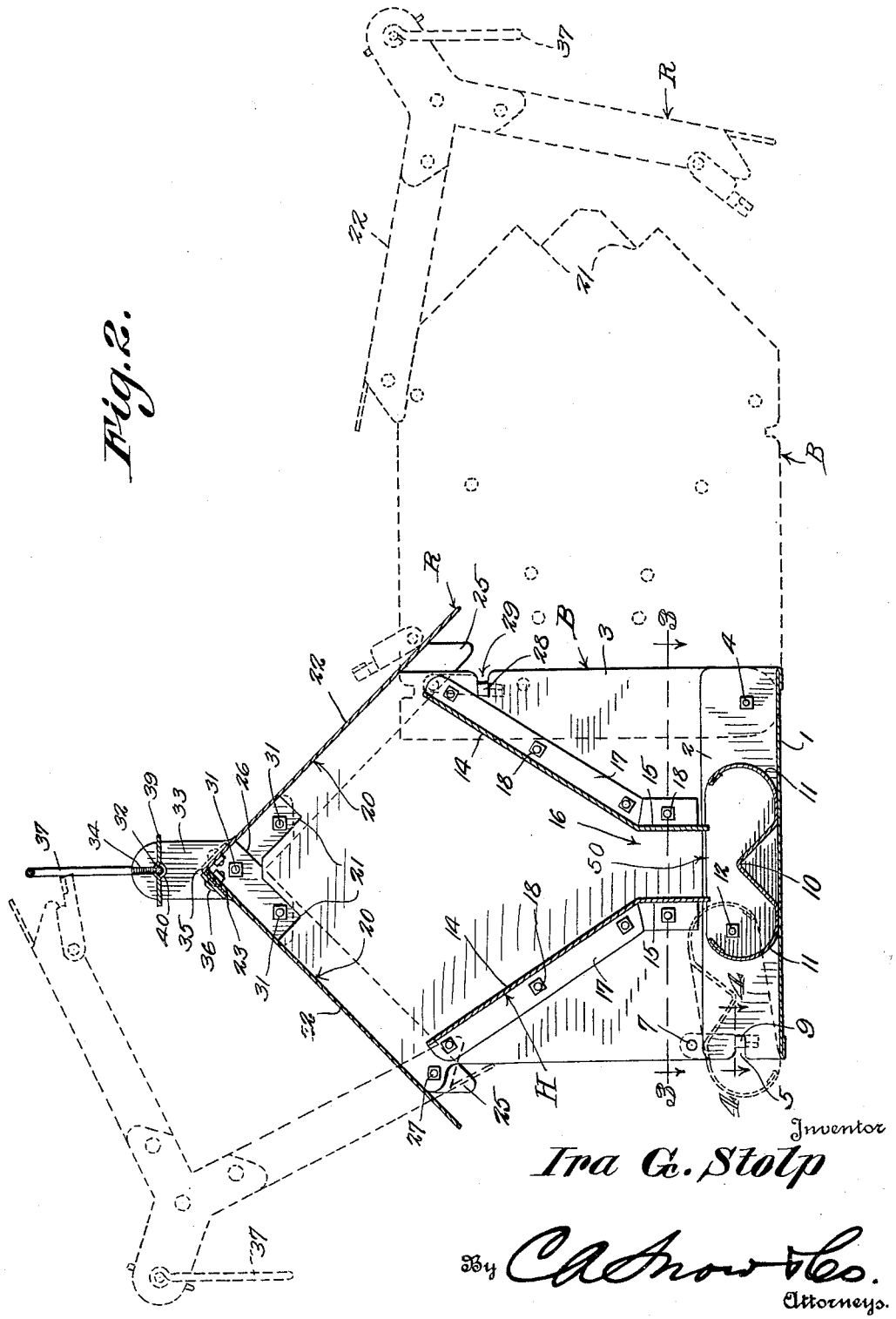
Fig. 2 is a transverse section.
Figure 3:
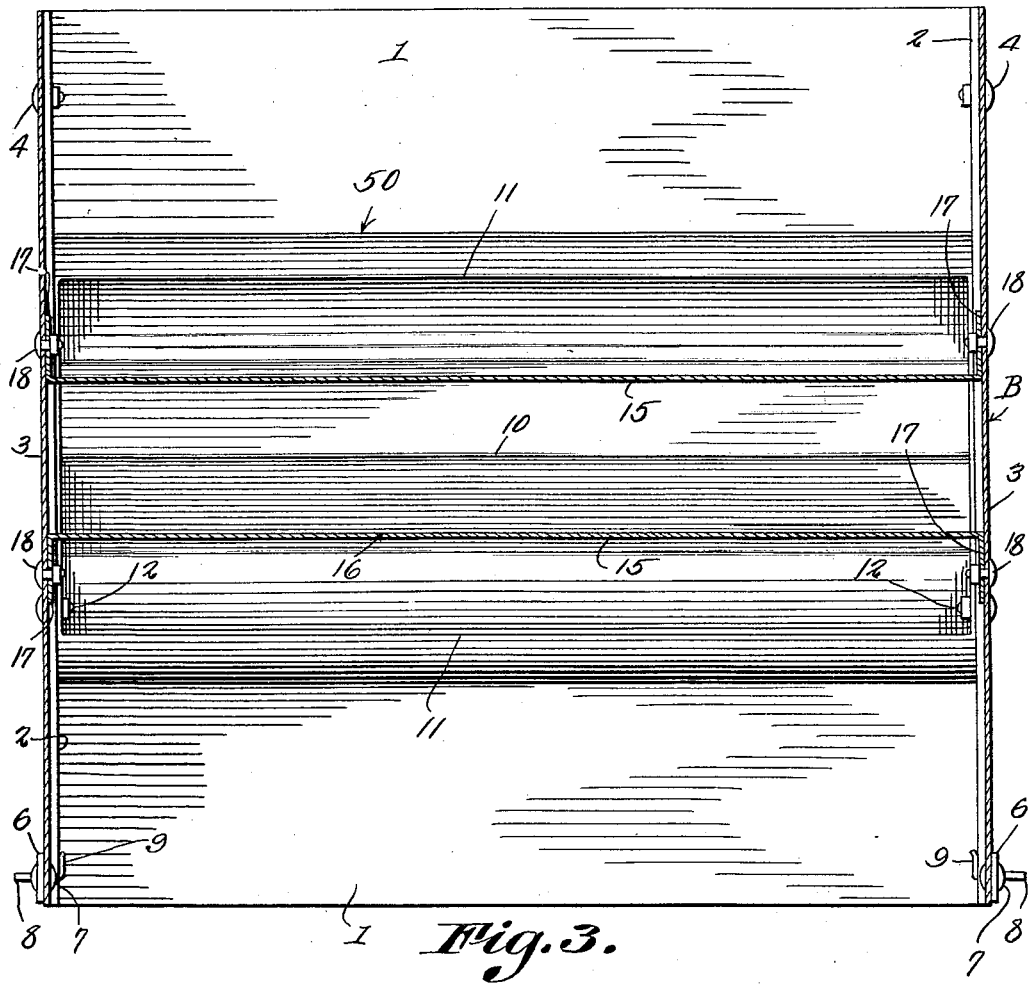
Fig. 3 is a horizontal section on the line 3—3 of Fig. 2.
Figure 4:
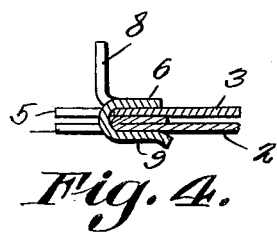
Fig. 4 is a fragmental horizontal section on the line 4—4 of Fig. 2.

There is provided a flat, plate-like bottom 1, supplied at its ends with rectangular, upstanding end flanges 2. The feeder comprises a body, denoted generally by the letter B, and including end walls 3. By means of pivot elements 4, one of which is shown in Fig. 2, the end flanges 2 of the bottom 1 are connected to the end walls 3 of the body B, near to one side of the body. It can be seen in Figs. 2 and 4, that, at the side of the body B remote from the pivot elements 4, the ends of the flanges 2 on the bottom 1, and the edges of the end walls 3, are provided with registering notches or seats 5. Latches 6 are provided, and one of them is depicted in detail in Fig. 5. The upper ends of the latches 6 are pivoted at 7 to the end walls 3 of the body. The latches 6 have outstanding finger pieces 8, whereby they may be manipulated conveniently. The latches 6 also carry hook-shaped keepers 9, adapted to be received in the registering seats 5 of the flanges 2 of the bottom 1, and of the end walls 3, the latches overlapping the inner surfaces of the flanges 2, as can be seen in Figs. 4 and 2. The latches 6 prevent the bottom 1 from swinging downwardly on the removable pivot elements 4.

Within the body, and between the flanges 2 of the bottom 1, is disposed a receptacle 50. The receptacle 50 ordinarily rests on the bottom 1. The receptacle 50 has an inverted, V-shaped longitudinal rib 10, extended between the end walls of the receptacle, and this rib forms troughs 11 at the opposite sides of the receptacle. Removable pivot elements 12 connect the end walls of the receptacle 50 with the flanges 2 of the bottom 1, and are located near to one side of the receptacle, as Fig. 2 will show.

A hopper H is located within the body B. It comprises two downwardly converging plates 14, provided at their lower edges with parallel extensions 15, forming a discharge throat 16. This discharge throat 16 is located immediately above the dividing rib 10 of the receptacle 50, so that the food discharged through the throat can flow to both of the troughs 11 of Fig. 2. The hopper plates 14 and their extensions 15 are supplied with rectangular flanges 17, connected by detachable securing elements 18 with the end walls 3 of the body B. It can be seen in Fig. 1 that, at the lower, outer corners of the hopper extensions 15, there are notches 19, which receive the upper edge portions of the flanges 2 on the bottom 1. This is done so that the extensions 15 can project down into the troughs 11, a little way, as Fig. 2 will disclose. The upper edges 20 of the end walls 3 are disposed at an acute angle, and at the apices of the end walls 3, there are pairs of notches 21, shown in Fig. 2. The purpose of these notches will be alluded to hereinafter.

Figure 1:
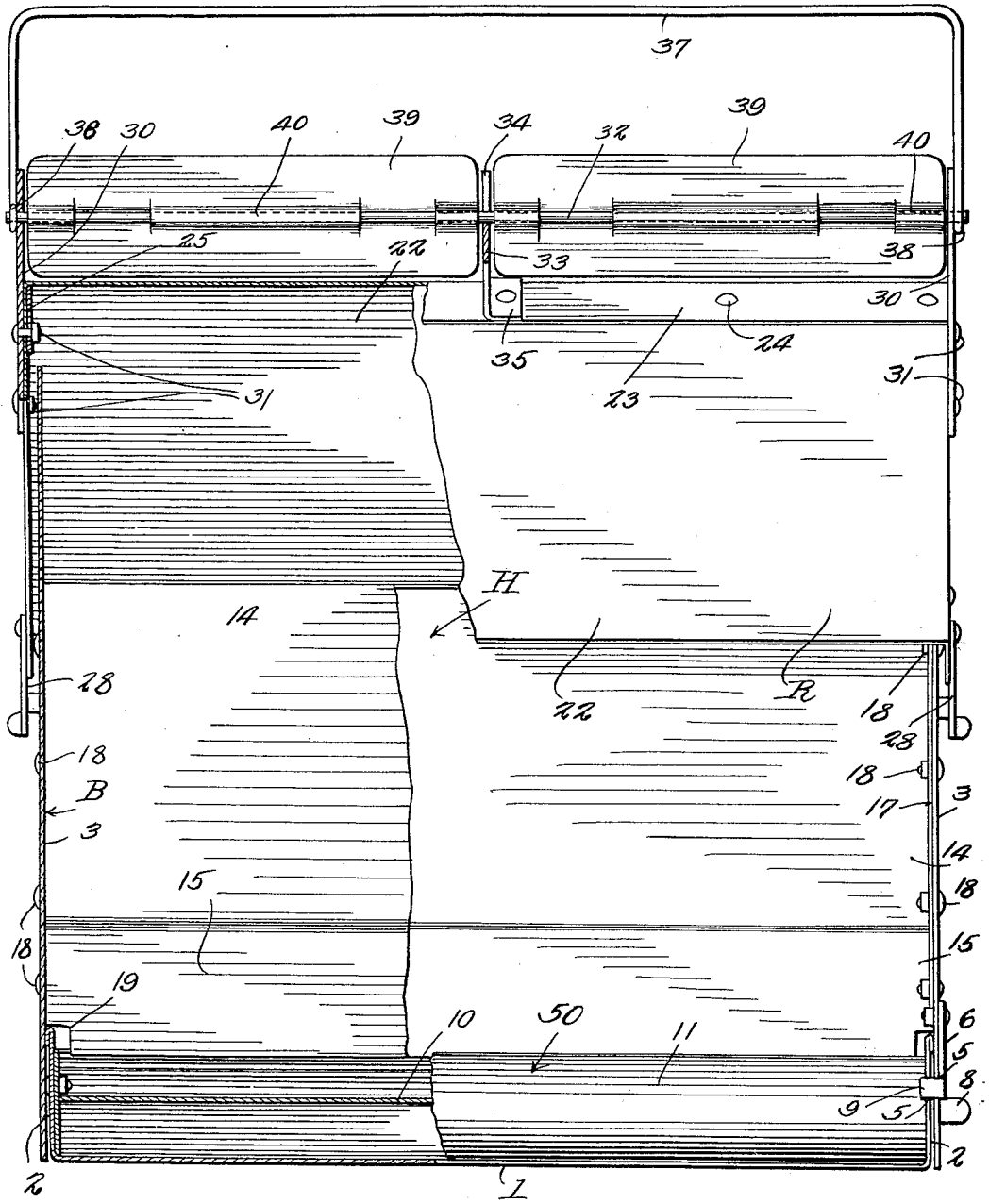
Fig. 1 shows, in side elevation, a device constructed in accordance with the invention, parts appearing in section.
Figure 5:
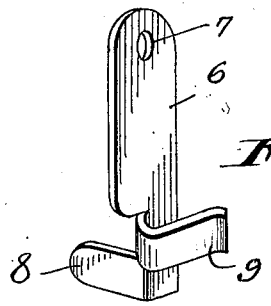
Fig. 5 is a perspective view showing one of the latches.

The roof R ordinarily rests on the edges 20 of the end walls 3, and the roof is made up of two plates 22. One of the plates 22 has a wing 23, overlapping the other roof plate, as shown in Fig. 1, the wing being connected to the other roof plate by removable securing elements 24, to form the ridge of the roof. The roof R is provided at its ends with depending, rectangularly disposed flanges 25, overlapping the end walls 3 of the body B. The flanges 25 are overlapped at their upper ends, as shown at 26 in Fig. 1. Near to one longitudinal edge of the roof R, the flanges 25 of the roof plates 22 are connected by detachable pivot elements 27 with the end walls 3 of the body B, the pivot elements 27 being located diagonally opposite to the pivot elements 4, so that the body B can be swung over in one direction, as indicated in dash line in Fig. 2, it being possible to open the roof R, in the opposite direction. Latches 28, constructed like the latches 6 of Fig. 5, are pivoted to the flanges 25 of the roof plates 22 and engage in seats 29 in the vertical edges of the end walls 3, to hold the roof R in the closed position of Fig. 2.

Inverted, Y-shaped posts 30 are provided, and are in the form of strips. The diverging arms of the posts 30 are overlapped on the outer sides of the roof flanges 25, and are connected thereto by detachable securing elements 31, one of these securing elements 31, at each end of the structure, being mounted in the overlapped portions 26 of the flanges 25, to promote the strength of the connection between the posts 30 and the flanges 25.

In the posts 30, a straight shaft 32, preferably a rod, is removably mounted. An intermediate support 33 for the shaft 32 may be provided, although this support may be omitted, if the shaft is of no great length. Figures 1 and 2 show that there is a notch 34 in the upper end of the support 33, in which the shaft 32 is received. This construction is desirable, because the shaft can be moved vertically, at a point intermediate its ends, when one end of the shaft is in one of the posts 30, and the other end of the shaft is being inserted through the other post 30. The intermediate support 33 has lateral, oppositely extended feet 35, connected to the roof plates 22 by securing elements 36, which may be removable, one of these securing elements passing, also, through the roof wing 23 of Fig. 1.

The numeral 37 marks a U-shaped handle or bail, the arms of which are located outside of the posts 30, and are provided with eyes 38, wherein the ends of the shaft 32 are detachably received. Plate-like chicken dumps 39 are located between the intermediate support 33 on the one hand, and the upper ends of the posts 30, on the other hand. The chicken dumps 39 have bearings 40 struck therefrom, intermediate the longitudinal edges of the chicken dumps, and by means of these bearings 40, the chicken dumps are pivotally mounted on the shaft 32. Although two dumps 39 are shown, it can be taken for granted, without a specific figure to show it, that if the operator wishes, he may omit the intermediate support 33 and make the two chicken dumps 39 in one piece, if the feeder is not very long.

The latches 28 can be freed from the keepers 29 of the end walls 3, and, then, the roof R may be swung to an open position, as shown by dash line at the left hand side of Fig. 2. The feed can be placed in the hopper H, and will flow downwardly through the throat 16 into the troughs 11 of the receptacle 50. When the roof R is in closed position, as shown in Fig. 2, the notches 21 in the end walls 3 receive the lowermost securing elements 31 and also make room for the uppermost securing elements 31.

The chickens can stand on the bottom 1, and are protected from the weather, the chickens eating out of the troughs 2. The roof R, of course, protects not only the chickens whilst they are eating, but also keeps the feed in the hopper H dry and clean.

The latches 6 can be freed from the seats 5, and the body B can be turned over horizontally, on the pivot elements 4, into the dash line position of Fig. 2. The receptacle 50 can be washed out, and can be inverted on the pivot elements 12, as shown in dash line in Fig. 2, the contents of the receptacle thus being thrown out on the bottom 1, and it being possible to keep the receptacle in a cleanly condition. The device can be carried about from place to place by means of the bail 37. The parts 39 are called chicken dumps, because they tend to rotate on the shaft 32 and prevent the chickens from roosting on the ridge of the roof R. The lower edges of the roof plates 22 extend outwardly, well beyond the outer edges of the bottom 1 and shed the rain clear of the bottom. The dash line showing of Fig. 2 indicates clearly to what an extent the feeder can be opened for washing and cleaning. It, therefore, may be kept in a thoroughly sanitary condition.

Because all of the securing elements are detachable or removable, the structure can be taken down and shipped in very small space.

Having thus described the invention, what is claimed is:—

A chicken feeder comprising a bottom, end walls pivoted to the bottom for lateral swinging movement, a roof pivoted to the end walls for upward swinging movement, a hopper under the roof and extended between the end walls, the hopper having a discharge throat, a receptacle for food under the discharge throat, and means for pivotally connecting the receptacle with the bottom, along an axis located within the receptacle, to enable the receptacle to be inverted whereby the food in the receptacle may be dumped on the bottom, when the end walls are swung laterally to carry the hopper from above the receptacle, the bottom being wide enough to form a rest for the inverted receptacle, and the roof extending outwardly at least as far as the outer edge of the inverted receptacle.

In testimony that I claim the foregoing as my own, I have hereto affixed my signature.

IRA GRANT STOLP.